United States Patent
Song et al.

(10) Patent No.: US 9,681,494 B2
(45) Date of Patent: Jun. 13, 2017

(54) SPLIT-TYPE MOBILE TERMINAL AND INTERACTION PROCESSING METHOD FOR COMMUNICATIONS EVENT

(71) Applicants: YULONG COMPUTER TELECOMMUNICATION SCIENTIFIC (SHENZHEN) CO., LTD., Guangdong (CN); DONGGUAN YULONG TELECOMMUNICATION TECH CO., LTD., Guangdong (CN)

(72) Inventors: Peng Song, Guangdong (CN); Bin Guo, Guangdong (CN); Xingdong Zhang, Guangdong (CN)

(73) Assignees: YULONG COMPUTER TELECOMMUNICATION SCIENTIFIC (SHENZHEN) CO., LTD., Guangdong (CN); DONGGUAN YULONG TELECOMMUNICATION TECH CO., LTD., Guangdong (CN)

( * ) Notice: Subject to any disclaimer, the term of this patent is extended or adjusted under 35 U.S.C. 154(b) by 0 days.

(21) Appl. No.: 14/786,750

(22) PCT Filed: Apr. 26, 2013

(86) PCT No.: PCT/CN2013/074803
§ 371 (c)(1),
(2) Date: Oct. 23, 2015

(87) PCT Pub. No.: WO2014/172894
PCT Pub. Date: Oct. 30, 2014

(65) Prior Publication Data
US 2016/0081138 A1 Mar. 17, 2016

(51) Int. Cl.
*H04M 11/00* (2006.01)
*H04W 88/06* (2009.01)
(Continued)

(52) U.S. Cl.
CPC ....... *H04W 88/06* (2013.01); *H04M 1/72569* (2013.01); *H04M 3/42136* (2013.01);
(Continued)

(58) Field of Classification Search
CPC .......... G06F 3/038; G06F 3/016; G06F 3/011; H04W 88/06
(Continued)

(56) References Cited

U.S. PATENT DOCUMENTS 7,649,522 B2 * 1/2010 Chen ..................... G06F 3/0383
345/156
7,652,660 B2 * 1/2010 Chen ..................... G06F 1/1632
345/156
(Continued)

FOREIGN PATENT DOCUMENTS

CN 201114640 Y 9/2008
CN 202435474 U 9/2012
(Continued)

OTHER PUBLICATIONS

International Search Report dated Feb. 21, 2014 from related PCT/CN2013/074803, together with an English language translation.
(Continued)

*Primary Examiner* — Sonny Trinh
(74) *Attorney, Agent, or Firm* — Scully, Scott, Murphy & Presser, P.C.

(57) ABSTRACT

The present invention provides a split-type mobile terminal which includes a host and at least one sub-device connected to the host. Wherein, the host includes: a state obtaining unit (102A) configured to obtain a real-time state of the host when a communications event occurs in the host; a state determining unit (102B) configured to determine whether or not the real-time state is a preset interactive state; a data interacting unit (102C) configured to send a response command to at least one of the at least one sub-device if the
(Continued)

determining result is yes; and a host processing unit (102D) configured to directly respond to the communications event if the determining result is no. Each sub-device includes a sub-device processing unit (1040) configured to respond to the communications event according to the received respond command. The present invention further provides an interaction processing method for a communications event.

16 Claims, 9 Drawing Sheets

(51) Int. Cl.
*H04M 1/725* (2006.01)
*H04M 3/42* (2006.01)

(52) U.S. Cl.
CPC ...... *H04M 1/7253* (2013.01); *H04M 1/72527* (2013.01); *H04M 1/72597* (2013.01)

(58) Field of Classification Search
USPC .............. 345/156, 169, 173, 575.1; 455/420, 455/556.1, 550.1, 403, 414.1, 575.1
See application file for complete search history.

(56) References Cited

U.S. PATENT DOCUMENTS

| | | | |
|---|---|---|---|
| 8,063,880 B2* | 11/2011 | Chen | G06F 1/1632 345/156 |
| 8,144,122 B2* | 3/2012 | Chen | G06F 3/0383 345/156 |
| 8,294,668 B2* | 10/2012 | Podoloff | G06F 1/1632 345/156 |

FOREIGN PATENT DOCUMENTS

| | | |
|---|---|---|
| EP | 1 259 088 A1 | 11/2002 |
| WO | 2004/086736 A1 | 10/2004 |

OTHER PUBLICATIONS

European Search Report dated Dec. 16, 2016 from related EP Application No. 13882806.6.

\* cited by examiner

SPLIT-TYPE MOBILE TERMINAL AND INTERACTION PROCESSING METHOD FOR COMMUNICATIONS EVENT

FIELD OF THE TECHNICAL

The present disclosure relates to mobile communications technology field, and particularly to a split-type mobile terminal and an interaction processing method for a communications event.

BACKGROUND

With the increased popularity of smart phones, accessories of mobile phones become more and more, besides usual earphones, mobile power banks, and mobile phones' shells, nowadays sub-devices which are attached to mobile phones and can realize communications function and data interaction function of a host become popular.

However, in the existed technical solution, by means of user's arbitrary selection, how to realize mobile phone' functions is determined, for example, whether or not the sub-device is used to realize current function response is determined. This technical solution is greatly related to user's subjectivity. If the user does not make a manual selection, whether or not it is the sub-device to realize response for function of the host cannot be recognized intelligently.

Therefore, the present invention provides an interaction processing technology for a communications event. The host can intelligently recognize a scenario according to a real-time state of the host, and accordingly determine a response mode according to the scenario, and a manual selection of a user is not required, thereby improving user's experience.

SUMMARY

Based on the problems set forth above, the present invention provides an interactive processing technology for a communications event. A host can intelligently recognize a scenario according to a real-time state of the host and correspondingly, determine a response mode according to the scenario, and a manual selection of a user is not required, thereby improving user's experience.

The present invention provides a split-type mobile terminal including a host and at least one sub-device connected to the host. Wherein, the host includes a state obtaining unit configured to obtain a real-time state of the host when a communications event occurs in the host, a state determining unit configured to determine whether or not the real-time state is a preset interactive state, a data interacting unit configured to send a response command to at least one of the at least one sub-device if the determining result generated by the state determining unit is yes, and a host processing unit configured to directly respond to the communications event if the determining result generated by the state determining unit is no. Each sub-device includes a sub-device processing unit configured to respond to the communications event according to the received respond command.

In the technical solution, a connection relationship between the host and the at least one sub-device can be established via Bluetooth, infrared connection, near field communication, or other. If one or more communications events occur during using the terminal, for example an incoming call, a short message, an instant communications message, an e-mail, a push notification, and so on, the host can recognize the corresponding application scenario according to the real-time state of the host, and correspondingly determine whether the host makes a response or the sub-device makes a response. Specifically, association relationships among states, application scenarios, and response modes can be stored in a network storage space corresponding to the host or the sub-device in advance by a manufacture or a user. Therefore, the host can determine a corresponding response mode according to the real-time state. Certainly, the stored association relationships can include a "white list", that is, at what state the sub-device is used to make a response. The stored association relationships can also include a "blacklist", that is, at what state the sub-device 104 is not used to make a response. For example, when the host is playing a video in full screen mode without an earphone inserted therein, the host recognizes that the host cannot be disturbed according to the scenario, and if there is a new short message, the host hands the communications event over to the sub-device. By intelligent determination, when the real-time state of the host is an interactive state, the sub-device can directly process a new task, thus events currently processed by the host will not be interrupted, thereby improving user's experience and portability of the terminal "Response" referred herein should be interpreted as outputting sound for prompt and/or outputting an interface graphic by the host or the sub-device which needs to make a response. When the sub-device needs to make a response, the host needs to transmit communication signals to the sub-device and receive processing commands from the sub-device via a communication channel between the host and the sub-device, to realize prompt for and processing for a communications event via the sub-device.

In the above-mentioned technical solution, preferably, the real-time state includes at least one of or a combination of the following: function modules currently called by the host, information of applications currently run by the host, running states of the applications installed in the host, external devices currently connected to the host, the profiles adopted by the host, the remaining battery capacity of the host, current time information, the current operator of the host, and the connection status between the host and at least one of the at least one sub-device.

In the technical solution, by detecting the real-time state of the host, it can ensure that when the real-time state is a preset interactive state, the host directly hands the new task over to the sub-device, thus current response of the host will not be interrupted, thereby facilitating user's operation. For detection of single type of real-time state, the detection efficiency substantially increases, the detection time decreases, and the response speed for a communications event increases. Detection of different types of real-time states assists in increasing the accuracy of the detection result, which realizes more intelligent processing.

In the technical solution, preferably, the host further includes a state storing unit configured to create an interactive list in the host or a network storage space corresponding to the host, and configured to store at least one interactive state in the interactive list to determine whether or not the real-time state of the host is an interactive state.

In the technical solution, by creating the interactive list, corresponding relationships between task scenarios and processing modes for communications events of the host can be created, and each task scenario corresponds to one processing mode. When the real-time state of the host (or corresponding task scenario) satisfies one interactive state recorded in the interactive list, the sub-device directly finishes corresponding operation. For example, when the host is playing a video in full screen mode without an earphone inserted therein, the sub-device is used to receive and process a new short message. Certainly, the user can look up the interactive list, and add a new interactive state to the interactive list, delete one interactive state from the interactive list, and edit the interactive list according to user's need.

In the above-mentioned technical solution, preferably, the data interacting unit is further configured to transmit a response stop command to the host processing unit according to the received response transfer command, and transmit the response command to at least one of the at least one sub-device. The host processing unit is further configured to stop responding to the communications event according to the received response stop command. Wherein, the host further stores the real-time state as an interactive state.

In the technical solution, when the real-time state is not recorded in advance, or the real-time state defaults to a non-interactive state in advance, the host directly responds to the communications event, which may not conform to using habits of the current user. If the sub-device is expected by the user to make a response and the sub-device is selected to make a response manually, on one hand, the sub-device is controlled to make a response, on the other hand, a new corresponding relationship is created in the interactive list, or the interactive list is modified. By recording user's operation, when the real-time state of the host does not satisfy any preset interactive state, the response mode for the communications event is adjusted according to user's operation habits, to make the usage of the sub-device be more convenient and human.

In the above-mentioned technical solution, preferably, the host further includes a type obtaining unit configured to obtain the type of the communications event, a type determining unit configured to determine whether or not the communications event is an interactive type. Wherein, when the communications event is the interactive type and the real-time state is an interactive state, the data interacting unit transmits the response command to at least one of the at least one sub-device, otherwise the host processing unit directly responds to the communications event.

In the technical solution, by determination of type of the communications event, the host directly makes a response when the communications event is not the interactive type, preventing the occurrence of this condition that the host hands the communication event over to the sub-device blindly to cause that the communications event cannot be interactively processed. Specifically, as the host is usually more powerful than the sub-device, the host may be lent to someone to play games, play movies, and so on. Some communications events with stronger privacy, such as short messages, incoming calls, and so on, may not be expected by the owner to be seen by others, thus the sub-device may be set to make a response. For some e-mails, the host directly makes a response. Additionally, due to limitation of the functions of the sub-device, the sub-device cannot effectively process some communications events, thus the response modes for communications events can be set according to this.

In the above-mentioned technical solution, preferably, the host further includes a condition determining unit configured to determine whether or not the at least one sub-device satisfies the response condition for the communications event. The data interacting unit is further configured to transmit the response command to at least one of the at least one sub-device if the determination result generated by the condition determining unit is yes. The host processing unit is further configured to directly respond to the communications event if the determination result generated by the condition determining unit is no. Wherein, the response condition includes at least one of or a combination of the following: the remaining battery capacity not less than a preset battery capacity threshold, hardware modules for responding to the communications event installed therein, and hardware modules for processing the communications event installed therein.

In the technical solution, by determining the ability of the sub-device, the condition that the host hands the communications event over to the sub-device blindly to cause that the sub-device cannot respond to the communications event will not occur. Wherein, the condition that the sub-device cannot respond to the communications event includes two aspects. Firstly, the real-time state of the host satisfies one interactive state in the interactive list, but the sub-device cannot finish corresponding operation due to resource limitation. For example, during playing a video in full screen mode by the host, when there is a new conversation task, even if in the interactive list it is the sub-device to respond to the new conversation task, but the sub-device cannot respond to the new conversation task as the current remaining battery capacity is not enough to make a conversation. Secondly, if in the interactive list there is no interactive operation corresponding to the real-time state of the host, when there is a new task, it is determined that the sub-device cannot respond to the new event, thus the host directly responds to the new task, and does not make a prompt for handing the new task over to the sub-device. For example, during playing a video in full screen mode by the host, when the QQ application receives a new message, it is determined that the sub-device cannot make a reply for the QQ message, thus the host directly makes a response to reply in time. By means of the technical solution, the interactive strategy between the host and the sub-device can be improved, and repeatedly switch between the host and the sub-device can be avoided.

In the above-mentioned technical solution, preferably, the sub-device further includes a response mode obtaining module configured to obtain the response mode of the host. Wherein, the sub-device processing unit makes a response according to the response mode of the host, or according to a preset mode corresponding to the response mode of the host.

In the technical solution, by limiting the response mode of the sub-device, the unity of the response modes of the host and the sub-device can be realized. For example, if the profiles of the host is meeting, when the sub-device needs to respond to the incoming call, the response mode also needs to conform to the meeting. In detail, for example, the sub-device makes a response in vibration mode. Certainly, the response mode of the sub-device can be the same as that of the host. However, in order to facilitate the user to distinguish which device is being used to make a response, the host and the sub-device can have different but correlated response modes, to cause the response modes of the host and the sub-device to be consistent and easily distinguished.

The present invention further provides an interaction processing method for a communications event, which is applied in a terminal including a host and at least one sub-device connected to the host. The method includes: obtaining a real-time state of the host when a communications event occurs in the host; determining whether or not the real-time state is a preset interactive state, if yes, controlling at least one of the at least one sub-device to respond to the communications event, otherwise, responding to the communications event directly by the host.

In the technical solution, a connection between the host and the at least one sub-device can be established via Bluetooth, infrared connection, near field communication, or other. If one or more communications events occur during using the terminal, for example an incoming call, a short message, an instant communications message, an e-mail, a push notification, and so on, the host can recognize the corresponding application scenario according to the real-time state of the host, and correspondingly determine whether the host makes a response or the sub-device makes a response. Specifically, association relationships among states, application scenarios, and response modes can be stored in a network storage space corresponding to the host or the sub-device in advance by a manufacture or a user. Therefore, the host can determine a corresponding response mode according to the real-time state. Certainly, the stored association relationships can include a "white list", that is, at what state the sub-device is used to make a response. The stored association relationships can also include a "black-list", that is, at what state the sub-device is not used to make a response. For example, when the host is playing a video in full screen mode without an earphone inserted therein, it is determined that the host cannot be disturbed at current time according to the scenario, and if there is a new short message, the host hands the communication event over to the sub-device. By intelligent determination, when the real-time state of the host is an interactive state, the host directly hands the new task over to the sub-device, thus events currently processed by the host will not be interrupted, thereby improving user's experience and portability of the terminal "Response" referred herein should be interpreted as outputting sound for prompt and/or outputting an interface graphic by the host or the sub-device which needs to make a response. When the sub-device needs to make a response, the host needs to transmit communication signals to the sub-device and receive processing commands from the sub-device via a communication channel between the host and the sub-device, to realize prompt for and processing for a communications event via the sub-device.

In the above-mentioned technical solution, preferably, the real-time state includes at least one of or a combination of the following: function modules currently called by the host, information of applications currently run by the host, running states of the applications installed in the host, external devices currently connected to the host, the profiles adopted by the host, the remaining battery capacity of the host, current time information, the current operator of the host, and the connection status between the host and at least one of the at least one sub-device.

In the technical solution, by detecting the real-time state of the host, it can ensure that when the real-time state is a preset interactive state, the host directly hands the new task over to the sub-device, thus events currently processed by the host will not be interrupted, thereby facilitating user's operation. For detection of single type of real-time state, the detection efficiency substantially increases, the detection time decreases, and the response speed for a communications event increases. Detection of different types of real-time states assists in increasing the accuracy of the detection result, which realizes more intelligent processing.

In the technical solution, preferably, the method further includes the following: creating an interactive list in the host or a network storage space corresponding to the host, and storing at least one interactive state in the interactive list which is used to determine whether or not the real-time state of the host is an interactive state.

In the technical solution, by creating the interactive list, corresponding relationships between task scenarios and processing modes for communications event of the host can be created, and each task scenario corresponds to one processing mode. When the real-time state of the host (or corresponding task scenario) satisfies one interactive state recorded in the interactive list, the sub-device directly finishes corresponding operation. For example, when the host is playing a video in full screen mode without an earphone inserted therein, the sub-device is used to receive and process a new short message. Certainly, the user can look up the interactive list, and add a new interactive state to the interactive list, delete one interactive state from the interactive list, and edit the interactive list according to user's need.

In the above-mentioned technical solution, preferably, after responding to the communications event directly by the host, the method further includes: stopping responding to the communications event by the host according to the received response transfer command, controlling at least one of the at least one sub-device to respond to the communications event, and storing the real-time state as an interactive state.

In the technical solution, when the real-time state is not recorded in advance, or the real-time state defaults to a non-interactive state in advance, the host directly responds to the communications event, which may not conform to using habits of the current user. If the sub-device is expected by the user to make a response and the sub-device is selected to make a response manually, on one hand, the sub-device is controlled to make a response, on the other hand, a new corresponding relationship is created in the interactive list, or the interactive list is modified. By recording user's operation, when the real-time state of the host does not satisfy any preset interactive state, the response mode for the communications event is adjusted according to user's operation habits, to make the usage of the sub-device be more convenient and human.

In the above-mentioned technical solution, preferably, the method further includes: obtaining the type of the communications event, and determining whether or not the communications event is an interactive type. Wherein, When the communications event is the interactive type and the real-time state is an interactive state, at least one of the at least one sub-device is controlled to respond to the communications event, otherwise the host directly responds to the communications event.

In the technical solution, by determination of type of the communications event, the host directly makes a response when the communications event is not the interactive type, thus the condition that the host hands the communication events over to the sub-device blindly to cause that the communications event cannot be interactively processed will not occur. Specifically, as the host is usually more powerful than the sub-device, the host may be lent to someone to play games, play movies, and so on. Some communications events with stronger privacy, such as short messages, incoming calls, and so on, may not be expected by the owner to be seen by others, thus the sub-device may be set to make a response. For some e-mails, the host directly makes a response. Additionally, due to limitation of the functions of the sub-device, the sub-device cannot effectively process some communications events, thus the response modes for communications events can be set according to this.

In the above-mentioned technical solution, preferably, the method further includes: determining whether or not the at least one sub-device satisfies the response condition for the communications event, if yes, controlling at least one of the at least one sub-device to respond to the communications event, otherwise, responding to the communications event directly by the host. Wherein, the response condition includes at least one of or a combination of the following: the remaining battery capacity not less than a preset battery capacity threshold, hardware modules for responding to the communications event installed therein, and hardware modules for processing the communications event installed therein.

In the technical solution, by determining the ability of the sub-device, the condition that the host hands the communications event over to the sub-device blindly to cause that the sub-device cannot respond to the communications event will not occur. Wherein, the condition that the sub-device cannot respond to the communications event includes two aspects. Firstly, the real-time state of the host satisfies one interactive state in the interactive list, but the sub-device cannot finish corresponding operation due to resource limitation. For example, during playing a video in full screen mode by the host, when there is a new conversation task, even if in the interactive list it is the sub-device to respond to the conversation task, but the sub-device cannot respond to the conversation task as the current remaining battery capacity is not enough to make a conversation. Secondly, if in the interactive list there is no interactive operation corresponding to the real-time state of the host, when there is a new task, it is determined that the sub-device cannot respond to the new event, thus the host directly responds to the new task, and does not make a prompt for handing the new task over to the sub-device. For example, during playing a video in full screen mode by the host, when the QQ application receives a new message, it is determined that the sub-device cannot make a reply for the QQ message, thus the host directly makes a response to reply in time. By means of the technical solution, the interactive strategy between the host and the sub-device can be improved, and repeatedly switch between the host and the sub-device can be avoided.

In the above-mentioned technical solution, preferably, when at least one of the at least one sub-device is used to respond to the communications event, the method further includes: obtaining the response mode of the host by the sub-device, making a response according to the response mode of the host, or making a response according to a preset mode corresponding to the response mode of the host.

In the technical solution, by limiting the response mode of the sub-device, the unity of the response modes of the host and the sub-device can be realized. For example, if the profiles of the host is meeting, when the sub-device needs to respond to an incoming call, the response mode also needs to conform to the meeting. In detail, for example, the sub-device makes a response in vibration mode. Certainly, the response mode of the sub-device can be the same as that of the host. However, in order to facilitate the user to distinguish which device is being used to make a response, the host and the sub-device can have different but correlated response modes, to cause the response modes of the host and the sub-device to be consistent and easily distinguished.

By means of the above-mentioned technical solution, the host can intelligently recognize a scenario according to a real-time state of the host and correspondingly, determine a response mode according to the scenario, and a manual selection of a user is not required, thereby improving user's experience.

DETAILED DESCRIPTION OF ILLUSTRATED EMBODIMENTS

To understand the above-mentioned purposes, features and advantages of the present disclosure more clearly, the present disclosure will be further described in detail below in combination with the accompanying drawings and the specific implementations. It should be noted that, the embodiments of the present application and the features in the embodiments may be combined with one another without conflicts.

Many specific details will be described below for sufficiently understanding the present disclosure. However, the present disclosure may also be implemented by adopting other manners different from those described herein. Accordingly, the protection scope of the present invention is not limited by the specific embodiments disclosed below.

Figure 1:
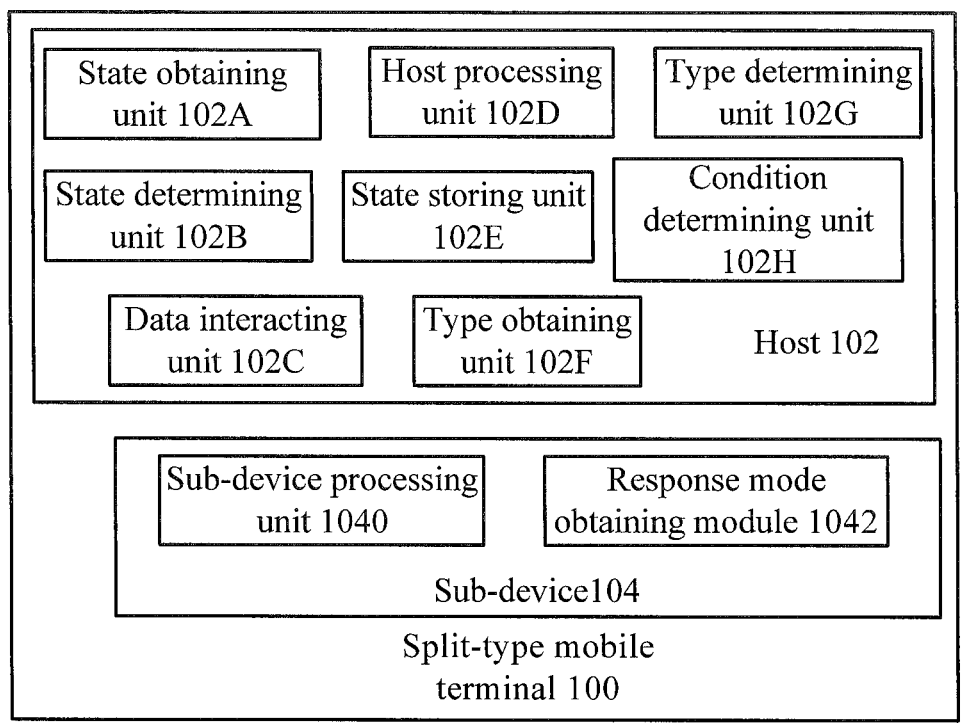
FIG. 1 shows a block diagram of a split-type mobile terminal in accordance with an exemplary embodiment of the present invention.

FIG. 1 shows a block diagram of a split-type mobile terminal in accordance with an exemplary embodiment of the present invention.

As shown in FIG. 1, a split-type mobile terminal 100 in accordance with an exemplary embodiment of the present invention includes a host 102 and at least one sub-device 104 connected to the host 102. Wherein, the host 102 includes a state obtaining unit 102A configured to obtain a real-time state of the host 102 when a communications event occurs in the host 102, a state determining unit 102B configured to determine whether or not the real-time state is a preset interactive state, a data interacting unit 102C configured to send a response command to at least one of the at least one sub-device 104 if the determining result generated by the state determining unit 102B is yes, and a host processing unit 102D configured to directly respond to the communications event if the determining result generated by the state determining unit 102B is no. Each sub-device 104 includes a sub-device processing unit 1040 configured to respond to the communications event according to the received respond command.

In the technical solution, a connection relationship between the host 102 and the at least one sub-device 104 can be established via Bluetooth, infrared connection, near field communication, or other. If one or more communications events occur during using the terminal, for example an incoming call, a short message, an instant communications message, an e-mail, a push notification, and so on, the host 102 can recognize the corresponding application scenario according to the real-time state of the host 102, and correspondingly determine whether the host 102 makes a response or the sub-device 104 makes a response. Specifically, association relationships among states, application scenarios, and response modes can be stored in a network storage space corresponding to the host 102 or the sub-device 104 in advance by a manufacture or a user. Therefore, the host 102 can determine a corresponding response mode according to the real-time state. Certainly, the stored association relationships can include a "white list", that is, at what state the sub-device 104 is used to make a response. The stored association relationships can also include a "blacklist", that is, at what state the sub-device 104 is not used to make a response. For example, when the host 102 is playing a video in full screen mode without an earphone inserted therein, the host 102 recognizes that the host 102 cannot be disturbed according to the scenario, and if there is a new short message, the host 102 hands the communications event over to the sub-device 104. By intelligent determination, when the real-time state of the host 102 is an interactive state, the sub-device 104 can directly process a new task, thus events currently processed by the host 102 will not be interrupted, thereby improving user's experience and portability of the terminal "Response" referred herein should be interpreted as outputting sound for prompt and/or outputting an interface graphic by the host 102 or the sub-device 102 which needs to make a response. When the sub-device 104 needs to make a response, the host 102 needs to transmit communication signals to the sub-device 104 and receive processing commands from the sub-device 104 via a communication channel between the host 102 and the sub-device 104, to realize prompt for and processing for a communications event via the sub-device 104.

In the above-mentioned technical solution, preferably, the real-time state includes at least one of or a combination of the following: function modules currently called by the host 102, information of applications currently run by the host 102, running states of the applications installed in the host 102, external devices currently connected to the host 102, the profiles adopted by the host 102, the remaining battery capacity of the host 102, current time information, the current operator of the host 102, and the connection status between the host 102 and the at least one sub-device 104.

In the technical solution, by detecting the real-time state of the host 102, it can ensure that when the real-time state is a preset interactive state, the host 102 directly hands the new task over to the sub-device 102, thus current response of the host 102 will not be interrupted, thereby facilitating user's operation. For detection of single type of real-time state, the detection efficiency substantially increases, the detection time decreases, and the response speed for a communications event increases. Detection of different types of real-time states assists in increasing the accuracy of the detection result, which realizes more intelligent processing.

In the technical solution, preferably, the host 102 further includes a state storing unit 102E configured to create an interactive list in the host 102 or a network storage space corresponding to the host 102, and configured to store at least one interactive state in the interactive list to determine whether or not the real-time state of the host 102 is an interactive state.

In the technical solution, by creating the interactive list, corresponding relationships between task scenarios and processing modes for communications events of the host 102 can be created, and each task scenario corresponds to one processing mode. When the real-time state of the host 102 (or corresponding task scenario) satisfies one interactive state recorded in the interactive list, the sub-device 104 directly finishes corresponding operation. For example, when the host 102 is playing a video in full screen mode without an earphone inserted therein, the sub-device 104 is used to receive and process a new short message. Certainly, the user can look up the interactive list, and add a new interactive state to the interactive list, delete one interactive state from the interactive list, and edit the interactive list according to user's need.

In the above-mentioned technical solution, preferably, the data interacting unit 102C is further configured to transmit a response stop command to the host processing unit 102D according to the received response transfer command, and transmit the response command to at least one of the at least one sub-device 104. The host processing unit 102D is further configured to stop responding to the communications event according to the received response stop command. Wherein, the host 102 further stores the real-time state as an interactive state.

In the technical solution, when the real-time state is not recorded in advance, or the real-time state defaults to a non-interactive state in advance, the host 102 directly responds to the communications event, which may not conform to using habits of the current user. If the sub-device 104 is expected by the user to make a response and the sub-device 104 is selected to make a response manually, on one hand, the sub-device 104 is controlled to make a response, on the other hand, a new corresponding relationship is created in the interactive list, or the interactive list is modified. By recording user's operation, when the real-time state of the host 102 does not satisfy any preset interactive state, the response mode for the communications event is adjusted according to user's operation habits, to make the usage of the sub-device 104 be more convenient and human.

In the above-mentioned technical solution, preferably, the host 102 further includes a type obtaining unit 102F configured to obtain the type of the communications event, a type determining unit 102G configured to determine whether or not the communications event is an interactive type. Wherein, when the communications event is the interactive type and the real-time state is an interactive state, the data interacting unit 102C transmits the response command to at least one of the at least one sub-device 104, otherwise the host processing unit 102D directly responds to the communications event.

In the technical solution, by determination of type of the communications event, the host 102 directly makes a response when the communications event is not the interactive type, preventing the occurrence of this condition that the host 102 hands the communication event over to the sub-device 104 blindly to cause that the communications event cannot be interactively processed. Specifically, as the host 102 is usually more powerful than the sub-device 104, the host 102 may be lent to someone to play games, play movies, and so on. Some communications events with stronger privacy, such as short messages, incoming calls, and so on, may not be expected by the owner to be seen by others, thus the sub-device 104 may be set to make a response. For some e-mails, the host 102 directly makes a response. Additionally, due to limitation of the functions of the sub-device 104, the sub-device 104 cannot effectively process some communications events, thus the response modes for communications events can be set according to this.

In the above-mentioned technical solution, preferably, the host 102 further includes a condition determining unit 102H configured to determine whether or not the at least one sub-device 104 satisfies the response condition for the communications event. The data interacting unit 102C is further configured to transmit the response command to at least one of the at least one sub-device 104 if the determination result generated by the condition determining unit 102H is yes. The host processing unit 102D is further configured to directly respond to the communications event if the determination result generated by the condition determining unit 102H is no. Wherein, the response condition includes at least one of or a combination of the following: the remaining battery capacity not less than a preset battery capacity threshold, hardware modules for responding to the communications event installed therein, and hardware modules for processing the communications event installed therein.

In the technical solution, by determining the ability of the sub-device 104, the condition that the host 102 hands the communications event over to the sub-device 104 blindly to cause that the sub-device 104 cannot respond to the communications event will not occur. Wherein, the condition that the sub-device 104 cannot respond to the communications event includes two aspects. Firstly, the real-time state of the host 102 satisfies one interactive state in the interactive list, but the sub-device 104 cannot finish corresponding operation due to resource limitation. For example, during playing a video in full screen mode by the host 102, when there is a new conversation task, even if in the interactive list it is the sub-device 104 to respond to the new conversation task, but the sub-device 104 cannot respond to the new conversation task as the current remaining battery capacity is not enough to make a conversation. Secondly, if in the interactive list there is no interactive operation corresponding to the real-time state of the host 102, when there is a new task, it is determined that the sub-device 104 cannot respond to the new event, thus the host 102 directly responds to the new task, and does not make a prompt for handing the new task over to the sub-device 104. For example, during playing a video in full screen mode by the host 102, when the QQ application receives a new message, it is determined that the sub-device 104 cannot make a reply for the QQ message, thus the host 102 directly makes a response to reply in time. By means of the technical solution, the interactive strategy between the host 102 and the sub-device 104 can be improved, and repeatedly switch between the host 102 and the sub-device 104 can be avoided.

In the above-mentioned technical solution, preferably, the sub-device 104 further includes a response mode obtaining module 1042 configured to obtain the response mode of the host 102. Wherein, the sub-device processing unit 1040 makes a response according to the response mode of the host 102, or according to a preset mode corresponding to the response mode of the host 102.

In the technical solution, by limiting the response mode of the sub-device 104, the unity of the response modes of the host 102 and the sub-device 104 can be realized. For example, if the profiles of the host 102 is meeting, when the sub-device 104 needs to respond to the incoming call, the response mode also needs to conform to the meeting. In detail, for example, the sub-device 104 makes a response in vibration mode. Certainly, the response mode of the sub-device 104 can be the same as that of the host 102. However, in order to facilitate the user to distinguish which device is being used to make a response, the host 102 and the sub-device 104 can have different but correlated response modes, to cause the response modes of the host 102 and the sub-device 104 to be consistent and easily distinguished.

Figure 2:
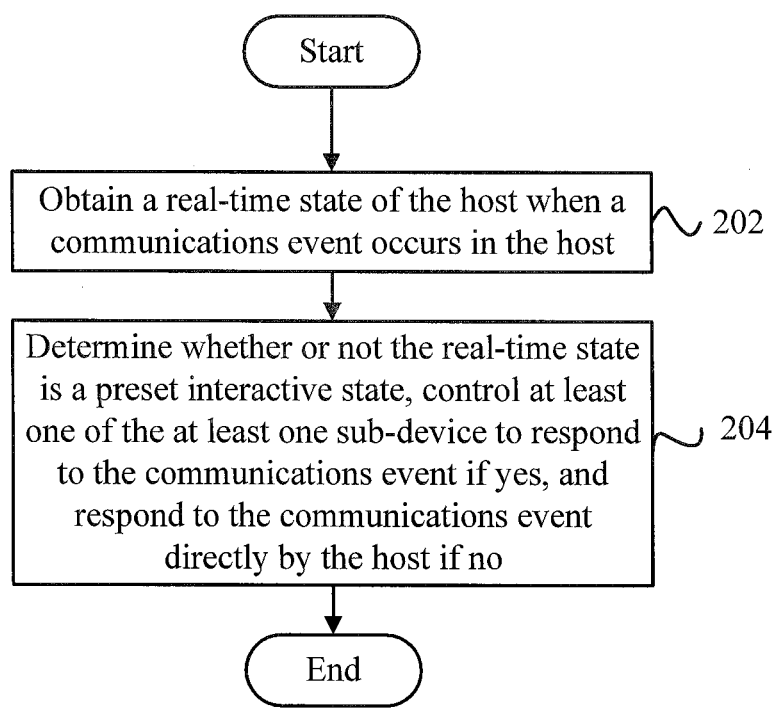
FIG. 2 shows a flow chart of an interaction processing method for a communications event in accordance with an exemplary embodiment of the present invention.

FIG. 2 shows a flow chart of an interaction processing method for a communications event in accordance with an exemplary embodiment of the present invention.

As shown in FIG. 2, the interaction processing method for a communications event in accordance with an exemplary embodiment of the present invention is applied in a terminal which includes a host and at least one sub-device connected to the host. The method includes: in step 202, obtaining a real-time state of the host when a communications event occurs in the host; in step 204, determining whether or not the real-time state is a preset interactive state, if yes, controlling at least one of the at least one sub-device to respond to the communications event, otherwise, responding to the communications event directly by the host.

In the technical solution, a connection between the host and the at least one sub-device can be established via Bluetooth, infrared connection, near field communication, or other. If one or more communications events occur during using the terminal, for example an incoming call, a short message, an instant communications message, an e-mail, a push notification, and so on, the host can recognize the corresponding application scenario according to the real-time state of the host, and correspondingly determine whether the host makes a response or the sub-device makes a response. Specifically, association relationships among states, application scenarios, and response modes can be stored in a network storage space corresponding to the host or the sub-device in advance by a manufacture or a user. Therefore, the host can determine a corresponding response mode according to the real-time state. Certainly, the stored association relationships can include a "white list", that is, at what state the sub-device is used to make a response. The stored association relationships can also include a "blacklist", that is, at what state the sub-device is not used to make a response. For example, when the host is playing a video in full screen mode without an earphone inserted therein, it is determined that the host cannot be disturbed at current time according to the scenario, and if there is a new short message, the host hands the communication event over to the sub-device. By intelligent determination, when the real-time state of the host is an interactive state, the host directly hands the new task over to the sub-device, thus events currently processed by the host will not be interrupted, thereby improving user's experience and portability of the terminal "Response" referred herein should be interpreted as outputting sound for prompt and/or outputting an interface graphic by the host or the sub-device which needs to make a response. When the sub-device needs to make a response, the host needs to transmit communication signals to the sub-device and receive processing commands from the sub-device via a communication channel between the host and the sub-device, to realize prompt for and processing for a communications event via the sub-device.

In the above-mentioned technical solution, preferably, the real-time state includes at least one of or a combination of the following: function modules currently called by the host, information of applications currently run by the host, running states of the applications installed in the host, external devices currently connected to the host, the profiles adopted by the host, the remaining battery capacity of the host, current time information, the current operator of the host, and the connection status between the host and at least one of the at least one sub-device.

In the technical solution, by detecting the real-time state of the host, it can ensure that when the real-time state is a preset interactive state, the host directly hands the new task over to the sub-device, thus events currently processed by the host will not be interrupted, thereby facilitating user's operation. For detection of single type of real-time state, the detection efficiency substantially increases, the detection time decreases, and the response speed for a communications event increases. Detection of different types of real-time states assists in increasing the accuracy of the detection result, which realizes more intelligent processing.

In the technical solution, preferably, the method further includes the following: creating an interactive list in the host or a network storage space corresponding to the host, and storing at least one interactive state in the interactive list which is used to determine whether or not the real-time state of the host is an interactive state.

In the technical solution, by creating the interactive list, corresponding relationships between task scenarios and processing modes for communications event of the host can be created, and each task scenario corresponds to one processing mode. When the real-time state of the host (or corresponding task scenario) satisfies one interactive state recorded in the interactive list, the sub-device directly finishes corresponding operation. For example, when the host is playing a video in full screen mode without an earphone inserted therein, the sub-device is used to receive and process a new short message. Certainly, the user can look up the interactive list, and add a new interactive state to the interactive list, delete one interactive state from the interactive list, and edit the interactive list according to user's need.

In the above-mentioned technical solution, preferably, after responding to the communications event directly by the host, the method further includes: stopping responding to the communications event by the host according to the received response transfer command, controlling at least one of the at least one sub-device to respond to the communications event, and storing the real-time state as an interactive state.

In the technical solution, when the real-time state is not recorded in advance, or the real-time state defaults to a non-interactive state in advance, the host directly responds to the communications event, which may not conform to using habits of the current user. If the sub-device is expected by the user to make a response and the sub-device is selected to make a response manually, on one hand, the sub-device is controlled to make a response, on the other hand, a new corresponding relationship is created in the interactive list, or the interactive list is modified. By recording user's operation, when the real-time state of the host does not satisfy any preset interactive state, the response mode for the communications event is adjusted according to user's operation habits, to make the usage of the sub-device be more convenient and human.

In the above-mentioned technical solution, preferably, the method further includes: obtaining the type of the communications event, and determining whether or not the communications event is an interactive type. Wherein, When the communications event is the interactive type and the real-time state is an interactive state, at least one of the at least one sub-device is controlled to respond to the communications event, otherwise the host directly responds to the communications event.

In the technical solution, by determination of type of the communications event, the host directly makes a response when the communications event is not the interactive type, thus the condition that the host hands the communication events over to the sub-device blindly to cause that the communications event cannot be interactively processed will not occur. Specifically, as the host is usually more powerful than the sub-device, the host may be lent to someone to play games, play movies, and so on. Some communications events with stronger privacy, such as short messages, incoming calls, and so on, may not be expected by the owner to be seen by others, thus the sub-device may be set to make a response. For some e-mails, the host directly makes a response. Additionally, due to limitation of the functions of the sub-device, the sub-device cannot effectively process some communications events, thus the response modes for communications events can be set according to this.

In the above-mentioned technical solution, preferably, the method further includes: determining whether or not the at least one sub-device satisfies the response condition for the communications event, if yes, controlling at least one of the at least one sub-device to respond to the communications event, otherwise, responding to the communications event directly by the host. Wherein, the response condition includes at least one of or a combination of the following: the remaining battery capacity not less than a preset battery capacity threshold, hardware modules for responding to the communications event installed therein, and hardware modules for processing the communications event installed therein.

In the technical solution, by determining the ability of the sub-device, the condition that the host hands the communications event over to the sub-device blindly to cause that the sub-device cannot respond to the communications event will not occur. Wherein, the condition that the sub-device cannot respond to the communications event includes two aspects. Firstly, the real-time state of the host satisfies one interactive state in the interactive list, but the sub-device cannot finish corresponding operation due to resource limitation. For example, during playing a video in full screen mode by the host, when there is a new conversation task, even if in the interactive list it is the sub-device to respond to the conversation task, but the sub-device cannot respond to the conversation task as the current remaining battery capacity is not enough to make a conversation. Secondly, if in the interactive list there is no interactive operation corresponding to the real-time state of the host, when there is a new task, it is determined that the sub-device cannot respond to the new event, thus the host directly responds to the new task, and does not make a prompt for handing the new task over to the sub-device. For example, during playing a video in full screen mode by the host, when the QQ application receives a new message, it is determined that the sub-device cannot make a reply for the QQ message, thus the host directly makes a response to reply in time. By means of the technical solution, the interactive strategy between the host and the sub-device can be improved, and repeatedly switch between the host and the sub-device can be avoided.

In the above-mentioned technical solution, preferably, when at least one of the at least one sub-device is used to respond to the communications event, the method further includes: obtaining the response mode of the host by the sub-device, making a response according to the response mode of the host, or making a response according to a preset mode corresponding to the response mode of the host.

In the technical solution, by limiting the response mode of the sub-device, the unity of the response modes of the host and the sub-device can be realized. For example, if the profiles of the host is meeting, when the sub-device needs to respond to an incoming call, the response mode also needs to conform to the meeting. In detail, for example, the sub-device makes a response in vibration mode. Certainly, the response mode of the sub-device can be the same as that of the host. However, in order to facilitate the user to distinguish which device is being used to make a response, the host and the sub-device can have different but correlated response modes, to cause the response modes of the host and the sub-device to be consistent and easily distinguished.

Figure 3:
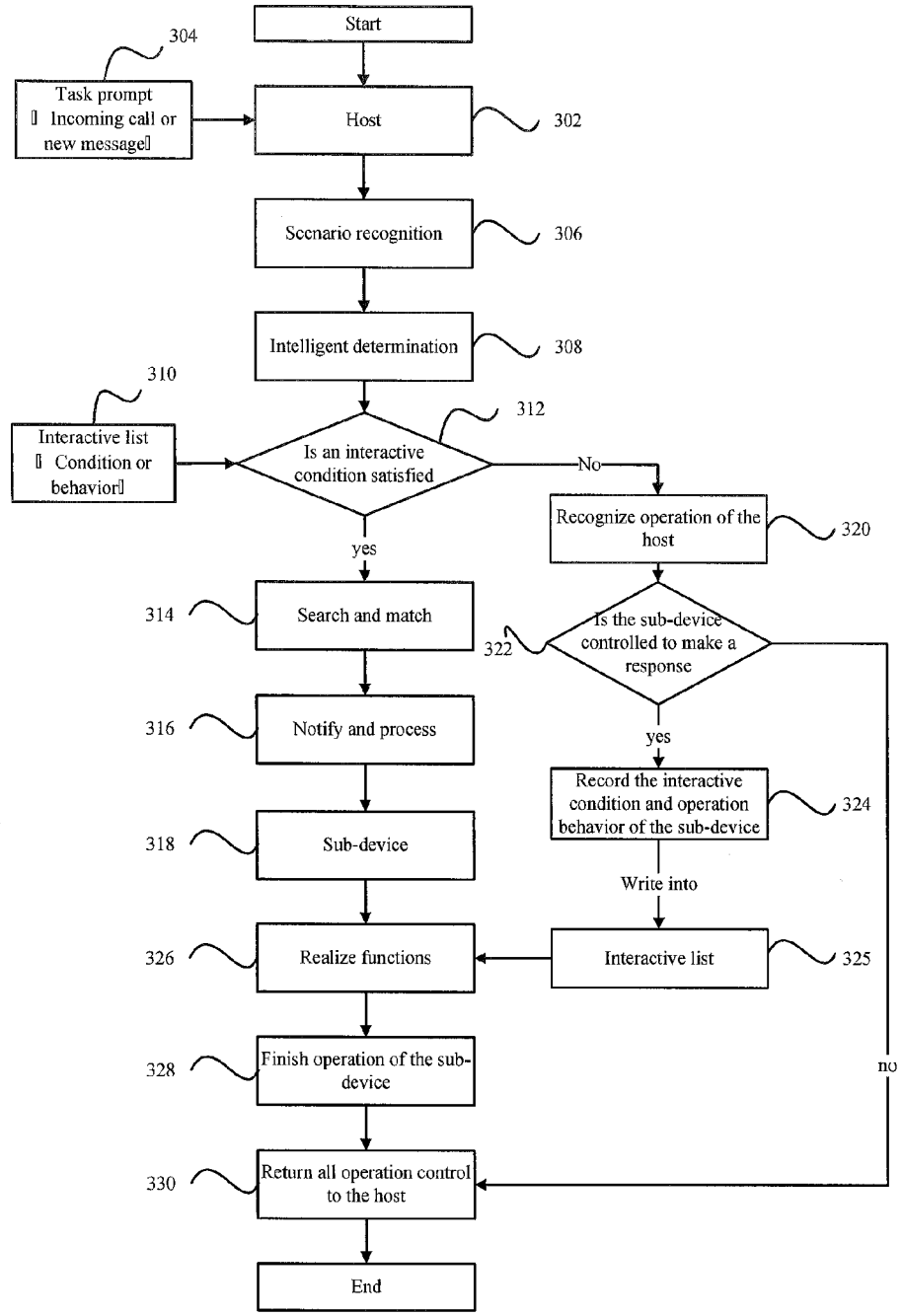
FIG. 3 shows a detailed flow chart of an interaction processing method for a communications event in accordance with an exemplary embodiment of the present invention.

FIG. 3 shows a detailed flow chart of an interaction processing method for a communications event in accordance with an exemplary embodiment of the present invention.

As shown in FIG. 3, a detailed process of an interaction processing method for a communications event in accordance with an exemplary embodiment includes the following.

In step 302, establishing a connection between the host and the sub-device via Bluetooth, infrared connection, near field communication, or other. Wherein, at beginning, the host is in charge of operation processing.

In step S304, determining that one or more communications events occur during using the terminal, for example an incoming call, a short message, an instant communications message, an e-mail, a push notification, and so on.

In step S306, recognizing the corresponding application scenario and determining the current usage state of the host according to the real-time state of the host when a new communications event occurs.

In step 308, determining whether it is the host or the sub-device to make a response intelligently by recognizing the application scenario.

In step S310, finishing the corresponding operation by the sub-device when the real-time state of the host (or corresponding task scenario) satisfies one interactive state recorded in the interactive list. Wherein, the interactive list records corresponding relationships between task scenarios and processing modes for communications event of the host, and each task scenario corresponds to one processing mode.

In step S312, inquiring the real-time state of the host, and determining whether or not the real-time state of the host and/or the sub-device (or corresponding task scenario) satisfies one interactive state in the interactive list. If yes, step 314 is executed, otherwise, step 320 is executed. the real-time state includes at least one of or a combination of the following: function modules currently called by the host, information of applications currently run by the host, running states of the applications installed in the host, external devices currently connected to the host, the profiles employed by the host, the remaining battery capacity of the host, current time information, the current operator of the host, and the connection state between the host and the at least one sub-device.

In step 314, searching in the interactive list to find a response mode of the sub-device corresponding to the real-time state of the host when the real-time state of the host satisfies one preset interactive state in the interactive list.

In step 316, obtaining the searched response mode of the sub-device corresponding to the real-time state of the host.

In step 318, receiving, by the sub-device, a notification for responding to the event transmitted by the host.

In step 320, responding to the communications event by the host if in step 312 the real-time state of the host does not satisfy any preset interactive state in the interactive list, for example, when the real-time state is not recorded in advance, or the real-time state defaults to a non-interactive state in advance. However, the preset processing mode may not conform to using habits of the current user, thus it needs to recognize the operation of the host, to determine whether or not the user selects to change the current response mode manually, for example, the user switches the host response to the sub-device response manually.

In step 322, executing step 324 if a switch operation exerted on the host is detected, otherwise executing step 330.

In step 324, recording interactive conditions and operations of the sub-device, that is, recording the real-time state of the host and the sub-device, and recording the real-time state as an interactive state. Actually, it is a process for collecting using habits of the user. The using habits of the user can be determined according to whether or not the user selects to switch to the sub-device response manually. If manual switch happens, especially if manual switch sequentially happens a number of times, the switch behavior is determined to be a using habit of the user, and the host automatically sets the current real-time state as an interactive state. When the host is in the state again, the host directly controls the sub-device to make a response.

In step 325, storing the current real-time state and the response mode corresponding to the current real-time state in the interactive list to form an association relationship, which is an embodiment of recording the user's habits. Wherein, a new association relationship can be created in the interactive list, or the original association relationship can be modified, to make that the sub-device can be directly selected to make a response according to the interactive list when the task again occurs.

In step 326, responding to the new task in the response mode of the host by the sub-device, or responding to the new task in a preset mode corresponding to the response mode of the host by the sub-device, upon receiving, by the sub-device, a notification transmitted by the host.

In step 328, finishing the communications event when the sub-device stops operating.

In step 330, handing operation control over to the host after the sub-device finishes responding to the task, or when the sub-device cannot respond to the task. The sub-device waits for the next response operation.

Figure 4:
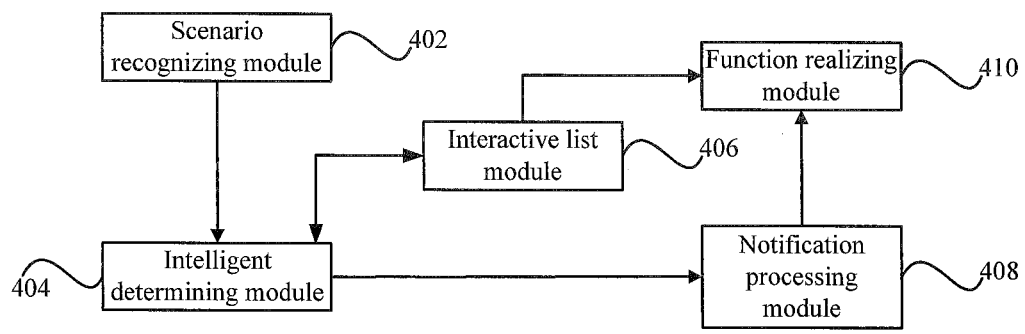
FIG. 4 shows a structure schematic view of a terminal for processing a communications event interactively in accordance with an exemplary embodiment of the present invention.

FIG. 4 shows a structure schematic view of a terminal capable of processing a communications event interactively in accordance with an exemplary embodiment of the present invention.

As shown in FIG. 4, a terminal capable of processing a communications event interactively in accordance with an exemplary embodiment of the present includes the following.

A scenario recognizing module 402 is configured to execute a self-check on the host, determine the real-time state of the host, and determine whether or not the real-time state of the host satisfies an interactive state when a new task (e.g., communications event) occurs. For example, the host is playing a video in full screen mode without an earphone inserted therein, playing a game, an so on.

An intelligent determining module 404 is configured to determine whether or not interactive response between the host and the sub-device can be realized by determining the real-time state of the host, determining whether or not the new task is the interactive type, and determining the response ability of the sub-device. Wherein, the real-time state of the host includes: function modules currently called by the host, information of applications currently run by the host, running states of the applications installed in the host, external devices currently connected to the host, the profiles adopted by the host, the remaining battery capacity of the host, current time information, the current operator of the host, and the connection state between the host and the sub-device. The response ability of the sub-device includes: the remaining battery capacity not less than a preset battery capacity threshold, hardware modules for responding to the communications event installed therein, and hardware modules for processing the communications event installed therein.

An interactive list module 406 is configured to establish corresponding relationships between task scenarios of the host and processing modes for communications events of the interactive operation of the sub-device, and each task scenario corresponds to one processing mode. When the real-time state of the host (or corresponding task scenario) satisfies one interactive state recorded in the interactive list, the sub-device directly finishes corresponding operation. For example, when the host is playing a video in full screen mode without an earphone inserted therein, the sub-device is used to receive and process a new short message. When the real-time state is not recorded in advance, or the real-time state defaults to a non-interactive state in advance, and the preset response mode does not conform to using habits of the user, if the sub-device is expected by the user to make a response and the sub-device is selected to make a response manually, on one hand, the sub-device is controlled to make a response, on the other hand, a new corresponding relationship is created in the interactive list, or the interactive list is modified. Certainly, the user can look up the interactive list, and add a new interactive state to the interactive list, delete one interactive state from the interactive list, and edit the interactive list according to user's need.

A notification processing module 408 is configured to notify the host of how to respond to the interactive operation according to the real-time state of the host. For example, if the profiles of the host is meeting, the sub-device needs to respond to incoming calls in meeting. When the real-time state of the host satisfies an interactive state, the host notifies the sub-device that the sub-device should response to the task delivered by the host according to the response mode of the host.

A function realizing module 410 is configured to select an appropriate response mode according to the real-time state of the host. For example, when the real-time state satisfies an interactive state, the sub-device is directed to make a response according to the response mode of the host, or the host makes a response by itself. After finishing responding, the control is returned to the host, and the sub-device waits for the next notification.

FIGS. 5A-5E show a schematic view of a setting interface for interactive processing for a communications event in accordance with an exemplary embodiment of the present invention.

In the technical solution of the present invention, the processing for a communications event includes host processing and sub-device processing. When a communications event occurs, the real-time state of the host is determined. If the real-time state is an interactive state, the sub-device is directed to respond to the communications event, otherwise, the host directly response to the communications event.

There are a number of ways to obtain the real-time state of the host. For example, the real-time state of the host is obtained by looking up applications or progresses currently run by the host, looking up function modules or application interfaces currently called by the host, and so on.

Certainly, besides recognition and determination of the state of the host, the state of the sub-device can also be recognized and determined. For example, whether or not the wireless connection between the sub-device and the host is normal is determined, whether or not the remaining battery capacity of the sub-device is enough is determined, and so on. Thus, when both the states of host and the sub-device satisfy preset conditions, the current communications event is handed over to the sub-device.

Also, the type of the current communications event can be recognized, and whether or not the communications event is handed over to the sub-device can be determined according to the type of the communications event. For example, incoming calls, short messages, and other events which should be processed immediately can be directly processed by the host, while e-mails, instant communication messages, and other events can be handed over to the sub-device. Furthermore, for short messages, e-mails, instant communication messages, and other communications events which have stronger privacy can be handed over to the sub-device, thus these communications events will not be seen by others when the host has been lent to others (As the host is usually more powerful, the host may be lent to others to play movies, play games, and so on).

Figure 5A:
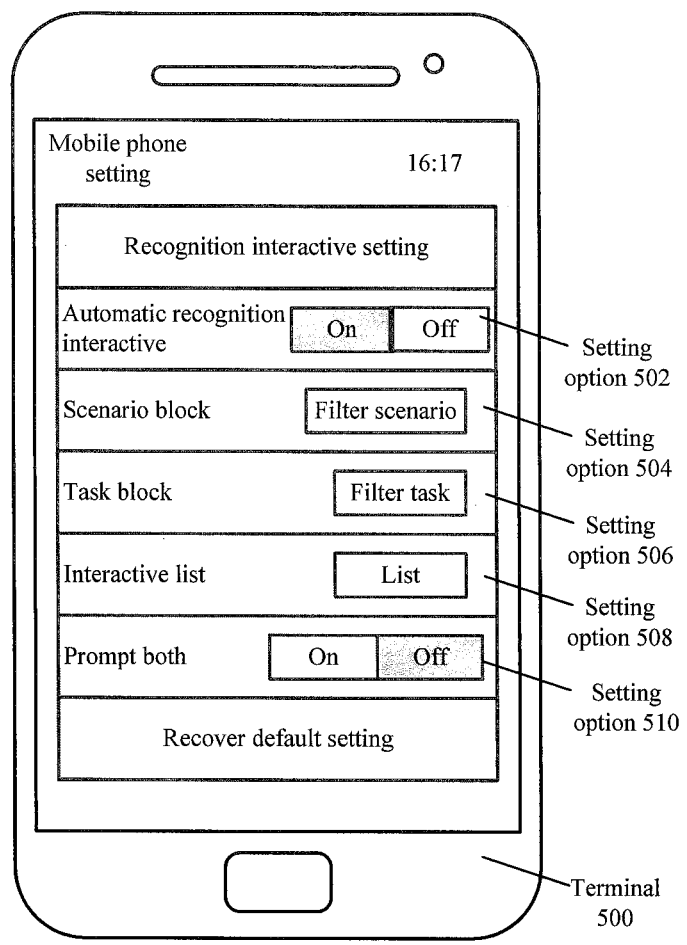
FIGS. 5A-5E show schematic views of a setting interface for processing a communications event interactively in accordance with an exemplary embodiment of the present invention.

To realize intelligent recognition and determination of scenarios, the processing modes of the host can be preset by the manufacture or the user. For example, as shown in FIG. 5A, if a terminal 500 is the host of the split-type mobile terminal of the present invention (the sub-device is not shown in the figure), a setting interface for interactive processing for a communications event according to an exemplary embodiment of the present invention is displayed on the terminal 500.

A setting option 502 is an automatic recognition interactive setting option, and is used to enable or disable the function for interactive processing for a communications event in embodiments of the present invention. When the function is enabled, the host recognizes and determines its own state (further including the states of the sub-device, the type of the communications event, and so on), to determine whether to directly respond to the current communications event or hand the current communications event over to the sub-device. When the function is disabled, the host directly responds to all communications events or directly hands all communications event to the sub-device according to default setting.

Figure 5B:
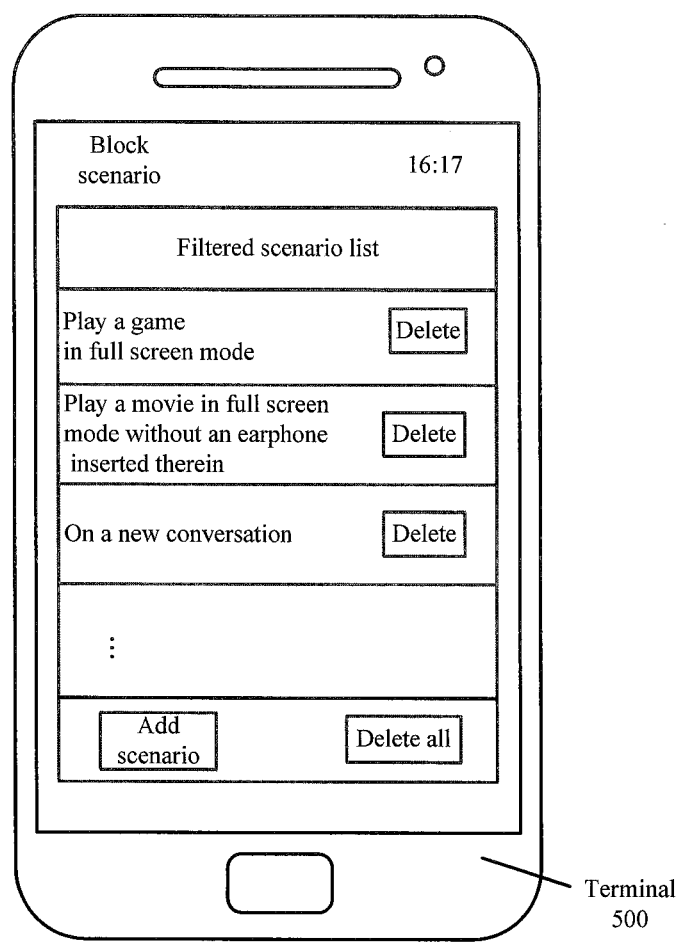

A setting option 504 is a scenario block setting option, and is used to block recognition of one or more specified scenarios, thus interactive operation is not executed between the host and the sub-device. The scenario which will not experience a recognition operation executed by the host can be added/deleted by the user according to this option, thus when the scenario occurs, the host directly responds to the task. Specifically, the setting operation interface for scenario block shown in FIG. 5B is displayed when the user clicks the scenario filtering option. A new scenario can be set when the user clicks the adding a scenario option. More specifically, for example, if there are a variety of preset filtering conditions, a corresponding scenario can be generated when the user executes a selection operation on these conditions. The user can further look up the scenario filtering list, and delete any one of the scenarios recorded in the list. For example, if the scenario of playing games in full screen mode had been set, when there is a new message or other communications event during playing a game in full screen mode, a recognition and determination operation will not be executed, and the host directly makes a response according to a preset rule.

Figure 5C:
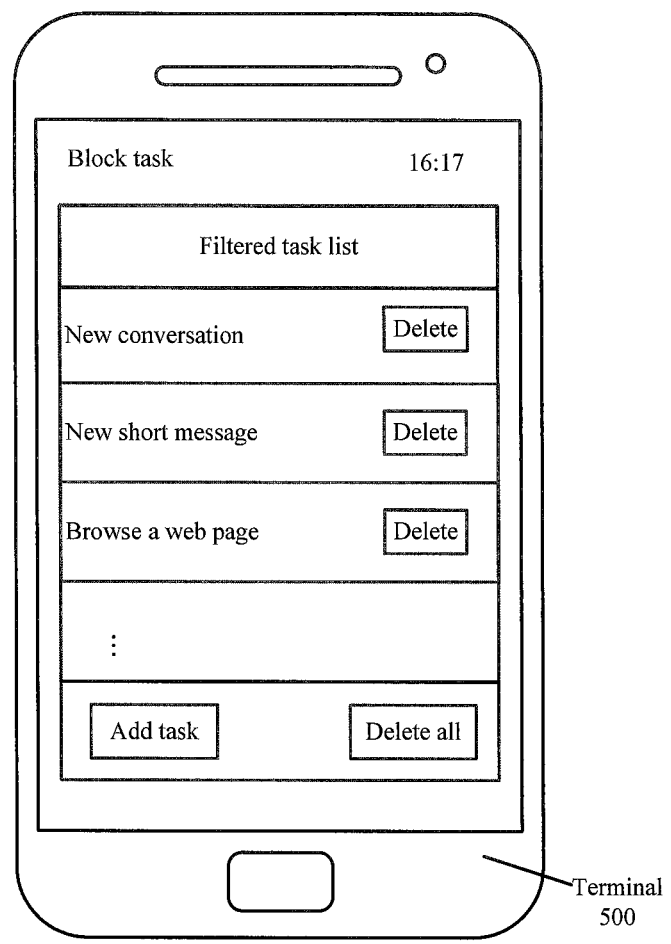

A setting option 506 is a task block setting option, and is used to block recognition of one or more specified tasks, thus interactive operation is not executed between the host and the sub-device. The task (that is, communications event) which will not experience a recognition operation executed by the host can be added/deleted by the user according to this option, thus when the task which is set to be blocked occurs, the host directly responds to the task. Specifically, for example, the setting interface for task block shown in FIG. 5C is displayed when the user clicks the task filtering option, thus an operation for adding a new task is executed when the user clicks the adding a task option, or the user can look up the task filtering list, and delete any one of the tasks recorded in the list. Specifically, for example, when the task for blocking a new conversation had been set, when a new conversation occurs, the host directly respond to the new conversation no matter what task the host is doing.

Figure 5D:
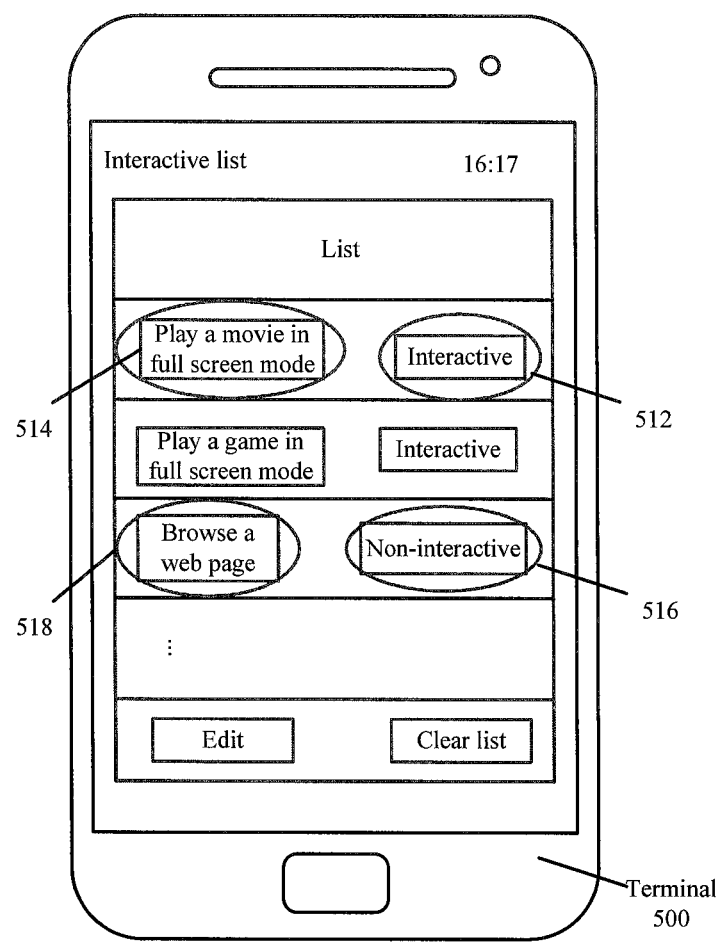

A setting option 508 is an interactive list setting option, and is used to look up the content in the stored interactive list. The user can add a new interactive task, delete one interactive task, and edit the interactive tasks in the interactive list. Specifically, for example, the list setting interface shown in FIG. 5D is displayed when the user clicks the list option, thus the user can look up a various of scenarios and corresponding settings. For example, for the scenario 514 of playing a movie in full screen mode in FIG. 5D, the corresponding setting 512 is interactive, thus when the real-time state of the host is playing a movie in full screen mode, the host can hand all communications events over to the sub-device. However, for the scenario 518 of browsing a web page, the corresponding setting 516 is non-interactive, thus when the real-time state of the host is browsing a web page, the host can directly respond to all communications events.

Figure 5E:
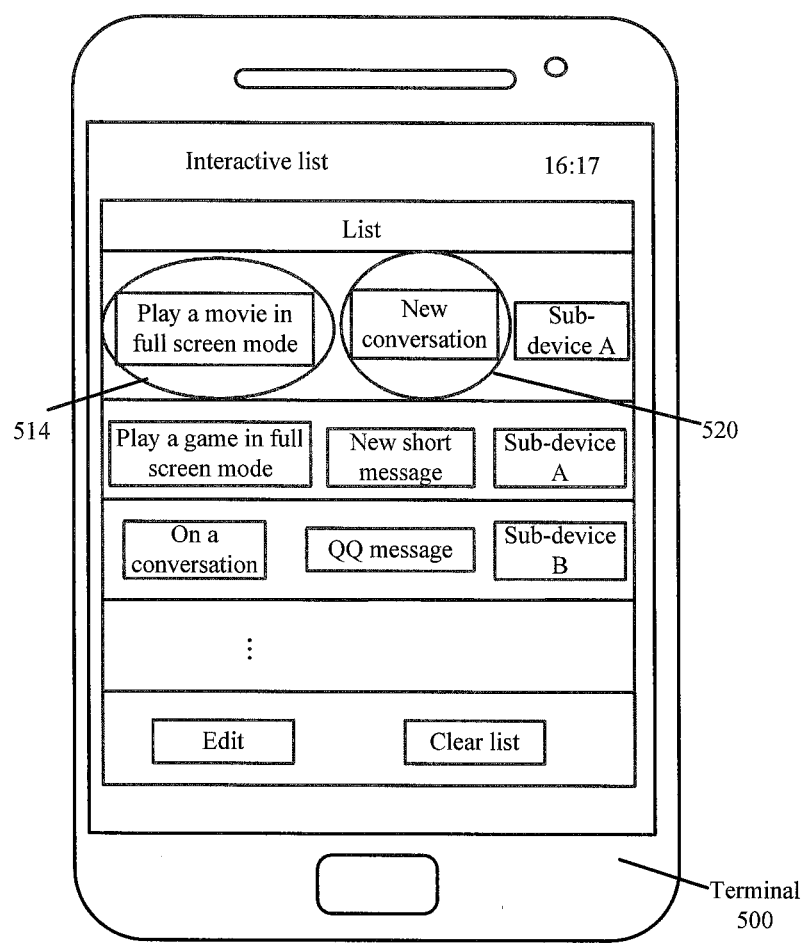

Referring to FIG. 5E, each host scenario can be set to correspond to one communications event. For example, for the scenario 514 of playing a movie in full screen mode, the corresponding communications event 520 is set to be a new conversation, thus when in the scenario 514, if a new conversation occurs, the host hands the new conversation task over to the sub-device.

Certainly, FIG. 5D and FIG. 5E are just used to illustrate the present invention. As described above, actually, it may be necessary to integrate considerations regarding the state of the sub-device, the type of the communications event, and so on, to make a comprehensive determination result.

A setting option 510 is a prompt setting option, and is used to set whether or not both the host and the sub-device output prompt when the host directs the sub-device to respond to an interactive task.

Additionally, for the scenario which is not preset by the host, or for the scenario which is preset to be non-interactive, if the communications event is handed over to the sub-device manually during user's actual operation, the host records the user's operation, and records the current scenario as an interactive scenario. When the scenario occurs again, the communications event is automatically handed over to the sub-device. Certainly, user's operation may be occasional, and the host records the user's operation and does not change the response mode. If in the scenario the user performs a manual operation for handing the communications event over to the sub-device a number of times, the host sets the current scenario to be an interactive scenario.

Furthermore, it should be further illustrated that the sub-device associated with the host can be one or more. As shown in FIG. 5E, when there are a number of sub-devices, it can be set that each sub-device is used to respond to one type of communications event, particularly, when there are differences among configurations of the sub-devices. For example, if the sub-device A only has a display screen for display a telephone number and basic communications text and physical buttons, but standby time is longer, the sub-device A can be used to respond to a call, a short message, and so on. For example, if the sub-device B is configured to have a greater touchscreen, the sub-device B can be used to respond to an instant communications message, and so on. Certainly, the user can make a selection and setting according to actual situation.

The above specifically illustrates the technical solution of the present invention in conjunction with the accompanying drawings. In the existed technical solution, the interactive operation between the host and the sub-device is controlled by user's objective setting and selection, and whether or not the interactive operation is finished cannot be intelligently recognized. Therefore, the present invention provides a split-type mobile terminal and an interaction processing method for a communications event. The host can intelligently recognize a scenario according to its own real-time state and correspondingly, determine the response mode according to the scenario, and a manual selection of a user is not required, thereby improving user's experience.

The foregoing descriptions are merely preferred embodiments of the present disclosure, rather than limiting the present disclosure. Various modifications and alterations may be made to the present disclosure for those skilled in the art. Any modification, equivalent substitution, improvement or the like made within the spirit and principle of the present disclosure shall fall into the protection scope of the present disclosure.

What is claimed is:

1. A split-type mobile terminal comprising:
   a host; and
   at least one sub-device connected to the host;
   wherein, the host comprises:
   a state storing unit configured to create an interactive list in the host or a network storage space corresponding to the host, and configured to store at least one interactive state in the interactive list to determine whether or not a real-time state of the host is one interactive state;
   a state obtaining unit configured to obtain a real-time state of the host when a communications event occurs in the host;
   a state determining unit configured to determine whether or not the real-time state is a preset interactive state according to the interactive list;
   a data interacting unit configured to send a response command to at least one of the at least one sub-device if the determining result generated by the state determining unit is yes;
   and
   a host processing unit configured to directly respond to the communications event if the determining result generated by the state determining unit is no;
   wherein, each of the at least one sub-device comprises a sub-device processing unit configured to respond to the communications event according to the received respond command.

2. The split-type mobile terminal of claim 1, wherein the real-time state comprises at least one of or a combination of the following:
   function modules currently called by the host, information of applications currently run by the host, running states of the applications installed in the host, external devices currently connected to the host, the profiles adopted by the host, the remaining battery capacity of the host, current time information, the current operator of the host, and the connection status between the host and at least one of the at least one sub-device.

3. The split-type terminal of claim 2, wherein the host further comprises:
   a condition determining unit configured to determine whether or not the at least one sub-device satisfies the response condition for the communications event;
   the data interacting unit is further configured to transmit the response command to at least one of the at least one sub-device if the determination result generated by the condition determining unit is yes;
the host processing unit is further configured to directly respond to the communications event if the determination result generated by the condition determining unit is no;
wherein, the response condition comprises at least one of or a combination of the following:
the remaining battery capacity not less than a preset battery capacity threshold, hardware modules for responding to the communications event installed therein, and hardware modules for processing the communications event installed therein.

4. The split-type terminal of claim 2, wherein the sub-device further comprises:
a response mode obtaining module configured to obtain the response mode of the host;
wherein, the sub-device processing unit makes a response according to the response mode of the host, or according to a preset mode corresponding to the response mode of the host.

5. The split-type terminal of claim 1, wherein the data interacting unit is further configured to transmit a response stop command to the host processing unit according to the received response transfer command, and transmit the response command to at least one of the at least one sub-device; the host processing unit is further configured to stop responding to the communications event according to the received response stop command; wherein, the host further stores the real-time state as an interactive state.

6. The split-type terminal of claim 1, wherein the host further comprises:
a type obtaining unit configured to obtain the type of the communications event;
a type determining unit configured to determine whether or not the communications event is an interactive type;
wherein, when the communications event is the interactive type and the real-time state is the preset interactive state, the data interacting unit transmits the response command to at least one of the at least one sub-device, otherwise the host processing unit directly responds to the communications event.

7. The split-type terminal of claim 1, wherein the host further comprises:
a condition determining unit configured to determine whether or not the at least one sub-device satisfies the response condition for the communications event;
the data interacting unit is further configured to transmit the response command to at least one of the at least one sub-device if the determination result generated by the condition determining unit is yes;
the host processing unit is further configured to directly respond to the communications event if the determination result generated by the condition determining unit is no;
wherein, the response condition comprises at least one of or a combination of the following:
the remaining battery capacity not less than a preset battery capacity threshold, hardware modules for responding to the communications event installed therein, and hardware modules for processing the communications event installed therein.

8. The split-type terminal of claim 1, wherein the sub-device further comprises:
a response mode obtaining module configured to obtain the response mode of the host;
wherein, the sub-device processing unit makes a response according to the response mode of the host, or according to a preset mode corresponding to the response mode of the host.

9. An interaction processing method for a communications event, the method being applied in a terminal comprising a host and at least one sub-device connected to the host, and comprising:
creating an interactive list in the host or a network storage space corresponding to the host;
storing at least one interactive state in the interactive list which is used to determine whether or not a real-time state of the host is one interactive state;
obtaining a real-time state of the host when a communications event occurs in the host; and
determining whether or not the real-time state is a preset interactive state according to the interactive list, if yes, controlling at least one of the at least one sub-device to respond to the communications event, otherwise, responding to the communications event directly by the host.

10. The interaction processing method for a communications event of claim 9, wherein the real-time state comprises at least one of or a combination of the following:
function modules currently called by the host, information of applications currently run by the host, running states of the applications installed in the host, external devices currently connected to the host, the profiles adopted by the host, the remaining battery capacity of the host, current time information, the current operator of the host, and the connection status between the host and at least one of the at least one sub-device.

11. The interaction processing method for a communications event of claim 10, wherein the method further comprises:
determining whether or not the at least one sub-device satisfies the response condition for the communications event, if yes, controlling at least one of the at least one sub-device to respond to the communications event, otherwise, responding to the communications event directly by the host;
wherein, the response condition comprises at least one of or a combination of the following:
the remaining battery capacity not less than a preset battery capacity threshold, hardware modules for responding to the communications event installed therein, and hardware modules for processing the communications event installed therein.

12. The interaction processing method for a communications event of claim 10, wherein when at least one of the at least one sub-device is used to respond to the communications event, the method further comprises:
obtaining the response mode of the host by the sub-device, making a response according to the response mode of the host, or making a response according to a preset mode corresponding to the response mode of the host.

13. The interaction processing method for a communications event of claim 9, wherein after responding to the communications event directly by the host, the method further comprises:
stopping responding to the communications event by the host according to the received response transfer command, and controlling at least one of the at least one sub-device to respond to the communications event;
storing the real-time state as one interactive state.

14. The interaction processing method for a communications event of claim 9, wherein the method further comprises:

obtaining the type of the communications event, and determining whether or not the communications event is an interactive type;

wherein, when the communications event is the interactive type and the real-time state is the preset interactive state, at least one of the at least one sub-device is controlled to respond to the communications event, otherwise the host directly responds to the communications event.

15. The interaction processing method for a communications event of claim 9, wherein the method further comprises:

determining whether or not the at least one sub-device satisfies the response condition for the communications event, if yes, controlling at least one of the at least one sub-device to respond to the communications event, otherwise, responding to the communications event directly by the host;

wherein, the response condition comprises at least one of or a combination of the following:

the remaining battery capacity not less than a preset battery capacity threshold, hardware modules for responding to the communications event installed therein, and hardware modules for processing the communications event installed therein.

16. The interaction processing method for a communications event of claim 9, wherein when at least one of the at least one sub-device is used to respond to the communications event, the method further comprises:

obtaining the response mode of the host by the sub-device, making a response according to the response mode of the host, or making a response according to a preset mode corresponding to the response mode of the host.

* * * * *